United States Patent [19]
Ehara et al.

[11] Patent Number: 5,458,766
[45] Date of Patent: Oct. 17, 1995

[54] LIFE INDICATOR AND CARTRIDGE FOR INDICATING TOTAL WATER FLOW

[75] Inventors: Katuo Ehara, Tokyo; Tadashi Okutoh, Kawasaki; Aya Nishino; Shigeru Sano, both of Takatsuki, all of Japan

[73] Assignee: Yuasa Corporation, Osaka, Japan

[21] Appl. No.: 117,757

[22] Filed: Sep. 8, 1993

[30] Foreign Application Priority Data

Sep. 14, 1992 [JP] Japan ................................ 4-244537
Aug. 3, 1993 [JP] Japan ................................ 5-192246

[51] Int. Cl.⁶ ...................................... B01D 17/12
[52] U.S. Cl. ...................... 210/87; 73/861; 210/90; 340/603
[58] Field of Search .................... 210/85, 87, 88, 210/89, 143, 90; 340/603, 606, 609; 73/861.08, 861.71, 861; 417/7; 116/202, 264, 273; 55/270, 274

[56] References Cited

U.S. PATENT DOCUMENTS

| | | | |
|---|---|---|---|
| 2,505,936 | 5/1950 | Behn | 324/441 |
| 2,611,007 | 9/1952 | Cade et al. | 324/441 |
| 2,611,113 | 9/1952 | Cade et al. | 324/441 |
| 2,616,949 | 11/1952 | Cade | 324/441 |
| 2,760,152 | 8/1956 | Katz et al. | 340/603 |
| 3,703,715 | 11/1972 | McNally | 340/606 |
| 3,726,606 | 4/1973 | Peters | 417/7 |
| 4,623,451 | 11/1986 | Oliver | 210/87 |
| 4,839,039 | 6/1989 | Parsons et al. | 210/143 |
| 4,918,426 | 4/1990 | Butts et al. | 210/89 |
| 4,986,782 | 1/1991 | Severtson | 340/606 |
| 5,089,144 | 2/1992 | Ozkahyaoglu et al. | 210/87 |
| 5,128,034 | 7/1992 | Kool | 210/87 |
| 5,131,277 | 7/1992 | Birdsong et al. | 210/87 |

FOREIGN PATENT DOCUMENTS 1244533  11/1988  Canada ................................ 340/603

*Primary Examiner*—Joseph W. Drodge
*Attorney, Agent, or Firm*—Evenson, McKeown, Edwards & Lenahan

[57] ABSTRACT

A life indicator is so designed that an electric current flows to a light emitting diode utilizing a battery as a power source when two electrodes are electrically connected. The two electrodes are so installed as to be electrically connected by passing water through a water passage communicating with an objective equipment, and the discharge life of the battery is set equal to the service life of the equipment.

10 Claims, 8 Drawing Sheets

LIFE INDICATOR AND CARTRIDGE FOR INDICATING TOTAL WATER FLOW

BACKGROUND OF THE INVENTION

This invention relates to a life indicator for indicating the service life of equipment whose service life is determined on the basis of a total water flow and a cartridge for a water purifier or a demineralizer equipped with this life indicator.

In recent years, in towns and cities, water quality has been contaminated due to an increase in population and industrial development, so that offensive odors and deterioration of taste of city water have become a public problem. For this reason, a household water purifier which is easily attached to a city water faucet to purify city water has been used widely. The water purifier is equipped with an exchangeable cartridge composed of a hollow fiber and activated carbon, and is adapted to remove offensive odors and various germs contained in city water by passing city water through the cartridge. The cartridge loses its function when the total water flow of city water passed through the cartridge exceeds specified quantity. That is, the a service life of the cartridge is determined on the basis of the above specified quantity and expires at a time when the total water flow reaches the above specified quantity. The cartridge generally exhausts its service life at about four to six months and must be exchanged.

Conventionally, a time at which a specified period has elapsed from the date the cartridge was placed into use written in the cartridge has been judged uniformly as the time to exchange the cartridge, and the cartridge has been exchanged.

However, the following problems have occurred in the above system based on writing the date of placing into use.

(1) The time to be exchanged is not clear when the user forgets to write the date of placing the unit in use, or the date becomes blurred.

(2) The quantity of water flow of city water through the cartridge differs for each household. Therefore, a cartridge which has not exhausted its service life yet but is functioning well might be exchanged, or a cartridge which has already exhausted its service life and is not functioning is still used successively, when the time to be exchanged is judged by an application period.

As a means for solving the above problems, an indicator using a float is well known. This indicator is one which utilizes a decrease in the quantity of water flow due to clogging of the hollow fiber in the cartridge, and can indicate a state of clogged hollow fiber to the outside by a mark attached to the float which sinks or rises on the basis of the decrease in the quantity of water flow. However, it sometimes occurs that the indicator indicates a wrong state because the quantity of water flow will be decreased when the water pressure is low or the faucet is partly closed. In addition, the service life of the cartridge can not be indicated correctly because only the state of the hollow fiber is indicated but the state of activated carbon is not indicated.

A cartridge equipped with a circuit for measuring an application time may be thought of, however, it is generally required to take countermeasures against changes in environment and external noises for an application as long as four to six months. Consequently, such a problem will arise that this indicator becomes complicated and expensive.

There is a demineralizer for obtaining water having a higher purity than that offered by the water purifier. The demineralizer is used for an industrial purpose in contrast with the water purifier generally used for domestic purpose. The demineralizer is also detachably equipped with a cartridge the service life of which is determined by the total water flow. This cartridge is equipped with an ion exchange resin. Exhaustion of the service life of the cartridge for a demineralizer has so far been detected as follows. (1) The service life is judged as exhausted when a specific resistance of purified water measured by a specific resistance meter becomes lower than a specified value, and (2) an indicator equipped with a circuit for measuring a water flowing time is installed because the demineralizer is one which can control a quantity of water flow per hour, and the total water flow is calculated by measuring the water flowing time by this indicator, so that the service life is judged as exhausted when the total water flow exceeds a specified quantity. However, there have been problems in the method (1) that the demineralizer itself has become expensive because of the expensive specific resistance meter, and in the method (2) that the demineralizer has become complicated and expensive as described above.

SUMMARY OF THE INVENTION

An object of this invention is to provide a life indicator which can correctly and easily indicate a service life of equipment whose service life is on the basis of total water flow, and to provide a cartridge for a water purifier or a demineralizer, the exchange time of which can be known correctly and easily.

A life indicator of this invention is a life indicator which is detachably attached to and used for equipment whose service life is determined on the basis of total water flow, and which indicates the service life of the unit; characterized in that the life indicator has a circuit including two electrodes, a battery and a light emitting diode which emits light utilizing the battery as a power source, and a water passage communicating with the unit. The two electrodes are so installed as to be electrically connected to each other in the water passage by passing water through the unit and, the water passage is equipped with a removal mechanism for removing water remaining between the two electrodes after completion of passing water. The circuit is so designed that an electric current flows to the light emitting diode when the two electrodes are electrically connected, and the battery has a discharge life which is set equal to the service life of the unit.

According to the life indicator having the above-mentioned structure, the light emitting diode emits light while water is passing, i.e., during use of the unit but, the light emitting diode does not emit light while water is not passing, i.e., while the unit is not used, so that the light emitting diode can emit light while the discharge life of the battery is not exhausted, i.e., the life of the unit is not exhausted. Therefore, exhaustion of the battery discharge life which, in turn, tells the life of the unit, can be known when the light emitting diode goes dark although the unit is still in use. Namely, the life indicator can indicate the exhaustion of service life, i.e., the exchange time of the unit by whether or not the light emitting diode is emitting light. Especially, water can be positively removed from the space between the two electrodes when the water passage is stopped because the removal mechanism is installed, and the light emitting diode can be securely shut off when the unit is not in use. Accordingly, the life of the equipment can be known surely from this point, too. In addition, the exchange time can be indicated simply and securely because the exchange time can be known by a clear visual check system such as whether the light emitting diode is lit or unlit. Further, the composition of the circuit, i.e., the composition of the life indicator is simple.

When the following concrete compositions are used for the life indicator having the above-mentioned structure, more preferable effects may become obtainable.

(1) The removal mechanism is composed of an air hole formed at an upstream side of the two electrodes, or the removal mechanism is formed by opening and obliquely cutting a downstream end of the water passage. In this composition, the structure can be made more simple because a troublesome mechanical device serving as the removal mechanism becomes unnecessary.

(2) The two electrodes are so installed as to be electrically connected utilizing passing water in the water passage as a medium, or the two electrodes are so installed that one electrode is deflected by the pressure of passing water in the water passage to contact with the other electrode so as to be electrically connected to it. In this composition, the structure can be made more simple because a mechanical device for connecting the two electrodes by passing water becomes unnecessary.

(3) The electrodes are installed at inclining positions with respect to the water passing direction. In this composition, the problem of obstruction of passing water caused by the two electrodes can be eliminated securely so that malfunction can be avoided.

(4) The battery has a voltage flatness and a property of abrupt drop in its voltage at a capacity end. In this composition, the exhaustion of the service life of equipment can be indicated correctly because the exhaustion of discharge life of the battery is indicated immediately as not-emitting-light of the light emitting diode.

A cartridge of this invention is a cartridge detachably attached to and used for a water purifier or a demineralizer and having a service life determined on the basis of total water flow; characterized in that the cartridge is equipped with a life indicator indicating the service life of the cartridge, the life indicator has a circuit including two electrodes, a battery and a light emitting diode which emits light utilizing the battery as a power source, and a water passage communicating with the cartridge, the two electrodes being so installed as to be electrically connected to each other in the water passage by passing water through the cartridge. The water passage is equipped with a removal mechanism for removing water remaining between the two electrodes after completion of passing water, said circuit being so designed that an electric current flows to the light emitting diode when the two electrodes are electrically connected. The discharge life of the battery is set equal to the service life of the cartridge.

According to the cartridge having the above-mentioned structure, since the exhaustion of service life can be known securely by the life indicator, occurrence of such disadvantages that a cartridge not exhausting its service life yet but functioning well is exchanged and a cartridge already exhausting its service life and not functioning is still used as it is, can be avoided. Especially, the removal mechanism is installed in the life indicator so that water can be positively removed from a space between the two electrodes when the water passing is stopped, and the light emitting diode can be securely put under the state of not-emitting-light when the cartridge is not used. Accordingly, the service life of the cartridge can be known surely from this point, too. In addition, the exchange time of the cartridge can be indicated simply and securely because the exchange time can be known by a clear visual check system such as whether the light emitting diode is lit or unlit. Further, the composition of the circuit, i.e., the composition of the life indicator is simple.

When the following concrete compositions are used for the life indicator having the above-mentioned structure, more preferable effects may become obtainable.

(1) The removal mechanism is composed of an air hole formed at an upstream side of the two electrodes, or the removal mechanism is formed by opening and obliquely cutting a downstream end of the water passage. In this composition, the structure can be made more simple because a troublesome mechanical device serving as the removal mechanism becomes unnecessary in the life indicator.

(2) The two electrodes are so installed as to be electrically connected utilizing passing water in the water passage as a medium, or the two electrodes are so installed that one electrode is deflected by the pressure of passing water in the water passage to contact with the other electrode so as to be electrically connected to it. In this composition, the structure can be made more simple because a mechanical device for connecting the two electrodes by passing water becomes unnecessary in the life indicator.

(3) The electrodes are installed at inclining positions with respect to the water passing direction. In this composition, the problem of obstruction of passing water caused by the two electrodes can be eliminated securely in the life indicator so that an indication of wrong service life of the cartridge by malfunction can be avoided.

(4) The battery has a voltage flatness and a property of abrupt drop in its voltage at a capacity end. In this composition, the exhaustion of the service life of the cartridge can be indicated correctly because the exhaustion of discharge life of the battery is indicated immediately as not-emitting-light of the light emitting diode in the life indicator.

DETAILED DESCRIPTION OF THE INVENTION

Embodiments of this invention will be described hereunder with reference to the drawings.

Embodiment 1

Figure 1:
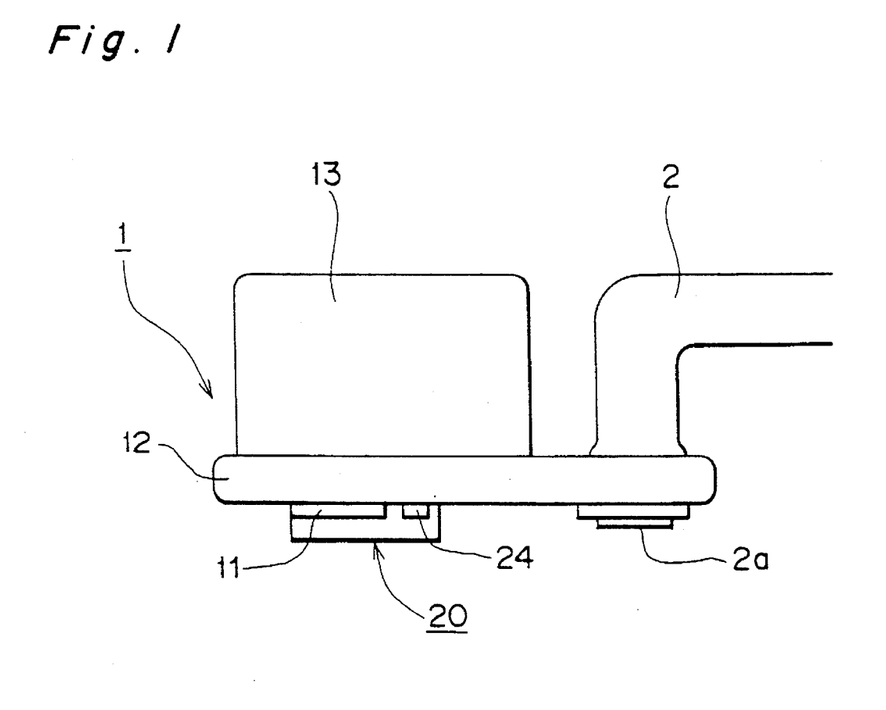
FIG. 1 is a front view showing a water purifier equipped with cartridges for a water purifier of embodiments 1 to 4.

FIG. 1 is a front view showing a water purifier using a cartridge of this embodiment. In this figure, 1 is a water purifier which is installed at a tip end of a city water pipe 2 so as to have a purified water outlet 11 independent from a city water outlet 2a. The water purifier 1 is composed of a base portion 12 and a cartridge 13 attached to the base portion in a detachable manner, and an indicator 20 indicating a service life of the cartridge 13 is attached to the cartridge 13 in a detachable manner.

Figure 2:
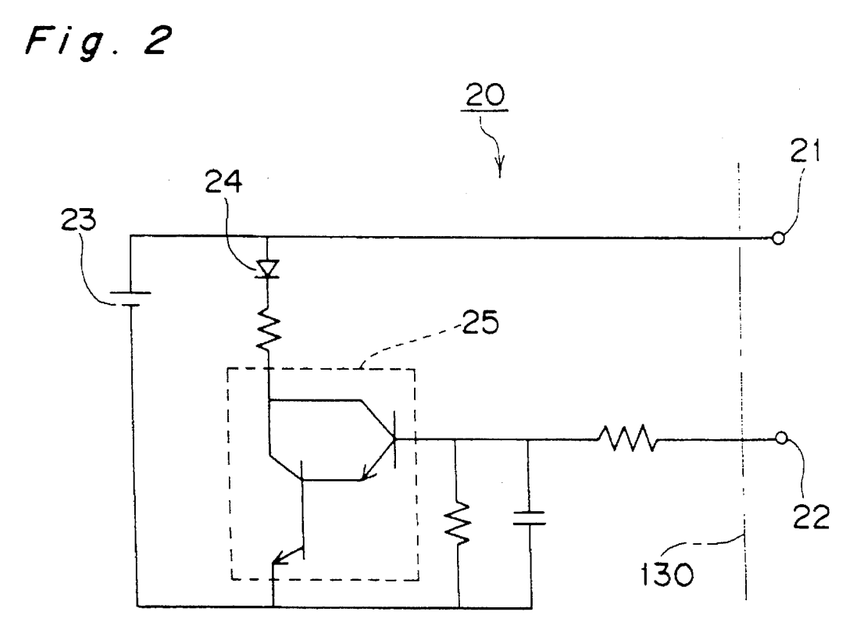
FIG. 2 is a circuit diagram showing a circuit for indicators of embodiments 1 and 2.

The indicator 20 is equipped with a circuit and a water passage 130 shown in FIG. 2. This circuit is equipped with two electrodes 21 and 22, coin type primary lithium battery 23, a red light emitting diode 24, and a darlington transistor 25. In the above circuit, the light emitting diode 24 is adapted to emit light utilizing the battery 23 as its power source when the electrodes 21 and 22 are electrically connected to each other. The transistor 25 is so installed as to amplify an electric current flowing to the light emitting diode 24 when the electrodes 21 and 22 are electrically connected. The light emitting diode 24 is installed at a position which can be checked visually as illustrated by FIG. 1. The water passage 130 is adapted to communicate with a water passage in the cartridge 13 when the indicator 20 is attached to the cartridge 13.

Figure 3:
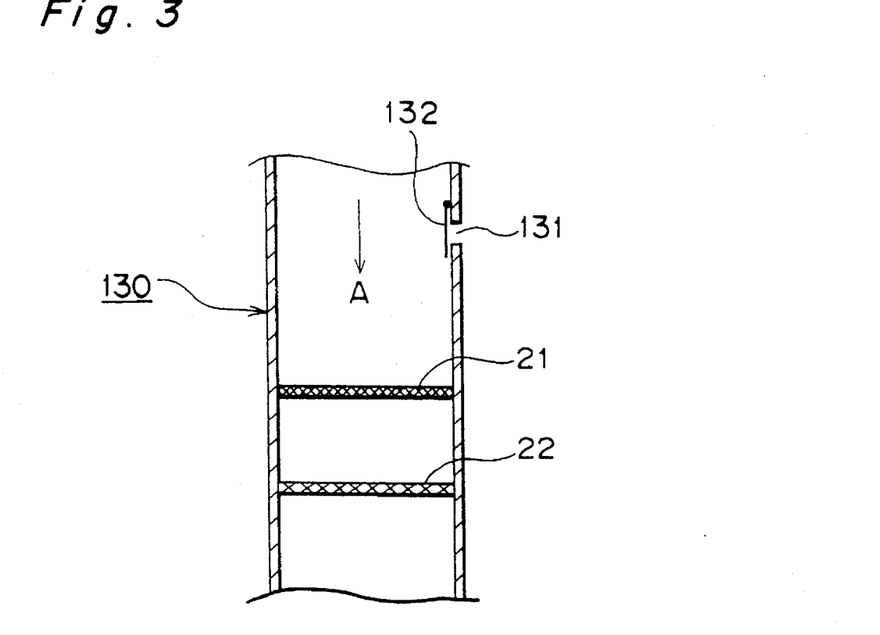
FIG. 3 is a schematic vertical sectional view showing a working state of a water passage for the indicator of embodiment 1.

The electrodes 21 and 22 are of mesh type made of stainless steel, and installed side by side midway in the water passage 130, so that they are located at right angles to the water-passing direction (direction of arrow A) of the water passage 130 and connected electrically to each other when water is passed in the direction of arrow A, as illustrated in FIG. 3. The water passage 130 is a pipe made of vinyl chloride. 131 is an air hole made at the upstream side of the upstream side electrode 21 of the water passage 130, and 132 is a valve opened and closed at the inside of the air hole 131. The air hole 131 passes through a wall of the water passage 130 in the normal direction. In the first embodiment, a removal mechanism for removing water remaining between the two electrodes 21 and 22 after completion of passing water is composed of the air hole 131 and the valve 132.

A battery 23 is used, which has a discharge life the same as the service life of the cartridge 13, has a voltage flatness, and has the property of abrupt drop in its voltage at the end of its capacity. For example, a battery having the following property is used. In the cartridge 13 of a general water purifier used for domestic purpose, a total filterable capacity is 1800 liters and a filterable quantity per minute is 2 liters. Consequently, the service life of the cartridge 13 is 900 minutes, that is, 15 hours. Since an electric current flowing in the circuit shown by FIG. 2 is 10 mA, the capacity of the battery 23 becomes 150 mAh when the battery is designed to have the same service life with that of the cartridge 13, i.e., 15 hours, so that it is enough to use a battery specified in JIS Model CR2025 for the battery 23. Incidentally, the primary lithium battery 23 has a voltage flatness and the property of abrupt drop in its voltage at the capacity end. The light emitting diode 24 has a lowermost drive voltage of 1.8 V to 2.0 V, and does not emit light at a voltage lower than this voltage. However, since the coin type primary lithium battery 23 has a working voltage of 3 V, it can drive the light emitting diode 24 enough.

Function will be described hereunder.

When the water purifier 1 is used, water passing through the city water pipe 2 is purified while going through the water passage in the cartridge 13 and flows out from the purified water outlet 11. The water going through the water passage in the cartridge 13 also goes through the water passage 130 of the indicator 20. In this instance, the electrodes 21 and 22 in the water passage 130 conduct, that is, connect electrically utilizing the water in the water passage 130 as a medium, so that the circuit shown in FIG. 2 is in the closed state to cause the light emitting diode 24 of the indicator 20 to emit light utilizing the battery 23 as its power source. FIG. 3 is a schematic vertical sectional view showing the water passage 130 under the state of passing water. Since the electrodes 21 and 22 are of the mesh type, they do not obstruct the passing of water.

While water is passed through the water passage 130, the electrodes 21 and 22 maintain the electrically connected state to keep the light emitting diode 24 lit. While water is passed, the air hole 131 is closed by the valve 132 as shown in FIG. 3.

Figure 4:
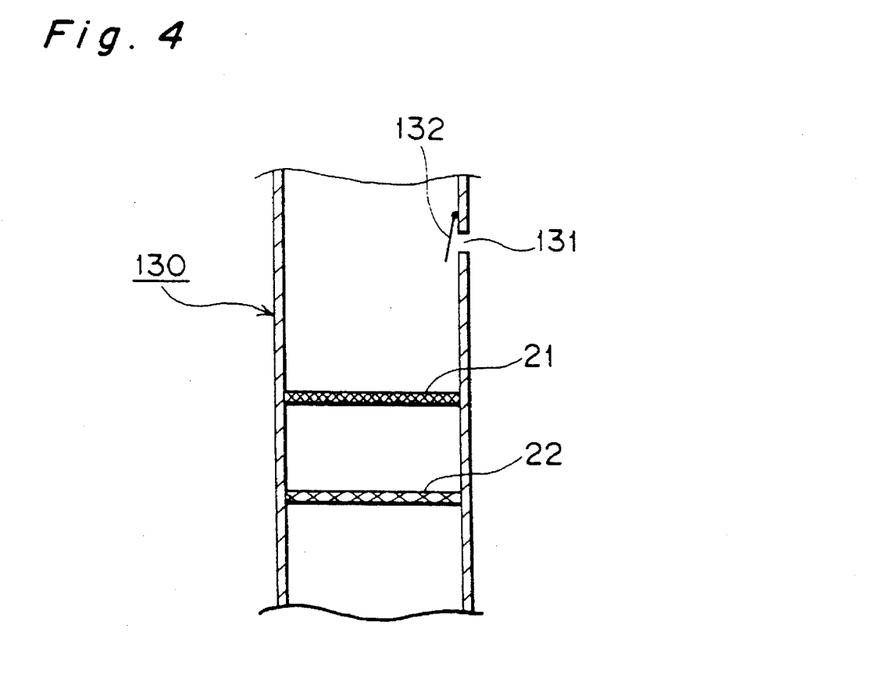
FIG. 4 is a schematic vertical sectional view showing a working state of the water passage for the indicator of embodiment 1.

When the water purifier 1 is not used, water does not pass through the water passage 130 so that the valve 132 is opened to permit air to flow from the air hole 131 into the water passage 130, water positively moves out of the space between the electrodes 21 and 22 to cause the electrodes 21 and 22 to be electrically disconnected, as shown by FIG. 4. Consequently, the circuit shown in FIG. 2 is opened and the light emitting diode 24 is dark. While water is not passed through the water passage 130, the electrodes 21 and 22 maintain the electrically disconnected state to keep the light emitting diode 24 unlit. FIG. 4 is a schematic vertical sectional view showing the water passage 130 under a state of not-passing water.

As described above, the light emitting diode 24 is emitting light while water is passing through the water passage 130 of the indicator 20, i.e., while the cartridge 13 is used, and the light emitting diode 24 is not emitting light while water is not passing through the water passage 130 i.e. while the cartridge 13 is not used. The battery 23 is consumed while the light emitting diode 24 is emitting light, i.e., while the cartridge 13 is used. In other words, the use of the cartridge 13 progresses keeping pace with the consumption of the battery 23. The service life of the cartridge 13 will become exhausted when the battery 23 is consumed to exhaust its discharge life because the discharge life of the battery 23 is set equal to the service life of the cartridge 13. When the discharge life of the battery 23 is exhausted, the light emitting diode 24 goes out even during use of the cartridge 13. Therefore, the exhaustion of service life of the cartridge 13 can be known by the fact that the light emitting diode 24 becomes unlit even during use of cartridge 13. Accordingly, the exhaustion of service life of the cartridge 13, i.e., the exchange time can be indicated by the light emitting diode 24 of the indicator 20.

The battery having voltage flatness and the property of abrupt drop in its voltage at the capacity end is used for the battery 23, so that the light emitting diode 24 positively emits light during the discharge life of the battery 23, and the light emitting diode 24 immediately goes out even during use of the cartridge 13 when the discharge life of the battery 23 is exhausted. Consequently, the service life of the cartridge 13 can be known correctly.

Since the indicator 20 having the above-mentioned structure is detachably attached to the cartridge 13, the indicator can be used by being attached to a new cartridge after being removed from the cartridge 13 and replacing the battery 23, when the discharge life of the battery 23 is exhausted, i.e., when the service life of the cartridge 13 is exhausted.

Embodiment 2

Figure 5:
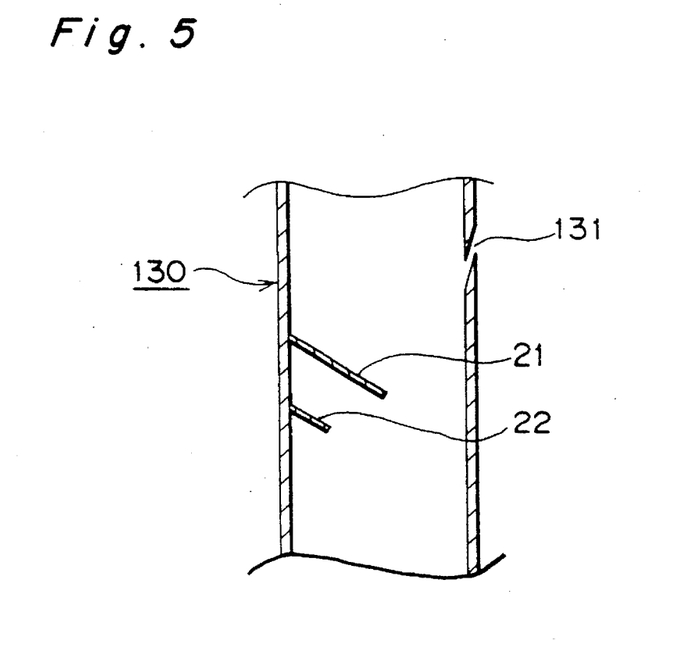
FIG. 5 is a schematic vertical sectional view showing a working state of a water passage for the indicator of embodiment 2.

A cartridge for water purifier of this embodiment is same with that of the embodiment 1 except for structures of the two electrodes 21 and 22 and the air hole 131 in the indicator 20. Namely, in the present embodiment, the electrodes 21 and 22 are formed into plate-like shapes made of stainless steel and have sizes which do not block the water passage 130. The electrodes 21 and 22 are installed side by side at positions directed inward and inclined downward. The upstream side electrode 21 is made larger than the downstream side electrode 22, and the electrode 22 is hidden by the electrode 21 viewing from the upstream side. The air hole 131 is formed into such a form as directed inward and inclined downward and passing through a wall of the water passage 130, and is not equipped with the valve 132 shown in the embodiment 1. In the present embodiment, the removal mechanism for removing the water remaining between the two electrodes 21 and 22 after completion of water passing is composed of the air hole 131.

Even in the present embodiment, the electrodes 21 and 22 are electrically connected and the light emitting diode 24 emits light utilizing the water as the medium when the water is passed through the water passage 130. When the water passing is stopped, air flows in from the air hole 131 and the water positively drains from between the electrodes 21 and 22 to cause the electrodes 21 and 22 to be electrically disconnected, so that the light emitting diode 24 goes out. Therefore, the function and effect the same as those of embodiment 1 can be obtained. In other words, the exhaustion of service life of the cartridge 13, i.e., the exchange time can be indicated by the light emitting diode 24 of the indicator 20.

In this embodiment, since the electrodes 21 and 22 are installed in a position not at right angles but inclined to the water passing direction, they do not obstruct the passing water. Further, since the air hole 131 does not require a valve, its structure is simple.

Embodiment 3

Figure 6:
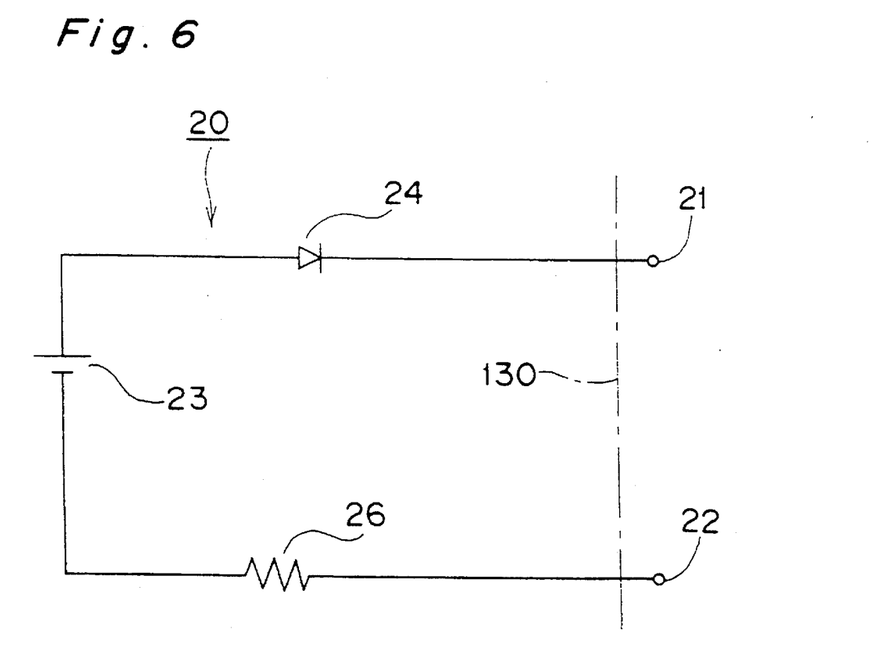
FIG. 6 is a circuit diagram showing a circuit for indicators of embodiments 3 and 4.

A cartridge for a water purifier of this embodiment is the same as that of embodiment 1 except for the structures of the circuit of the indicator 20 and the electrodes 21 and 22. FIG. 6 is a diagram showing a circuit of the indicator 20 for use in this embodiment. This circuit is equipped with the two electrodes 21 and 22, the coin type primary lithium battery 23, the red light emitting diode 24, and a resistance 26. In the above circuit, the light emitting diode 24 is adapted to emit light utilizing the battery 23 as its power source when the electrodes 21 and 22 are electrically connected. In this embodiment, an electric current flowing through the circuit of the indicator 20 is set to 10 mA by selecting the resistance 26.

Figure 7:
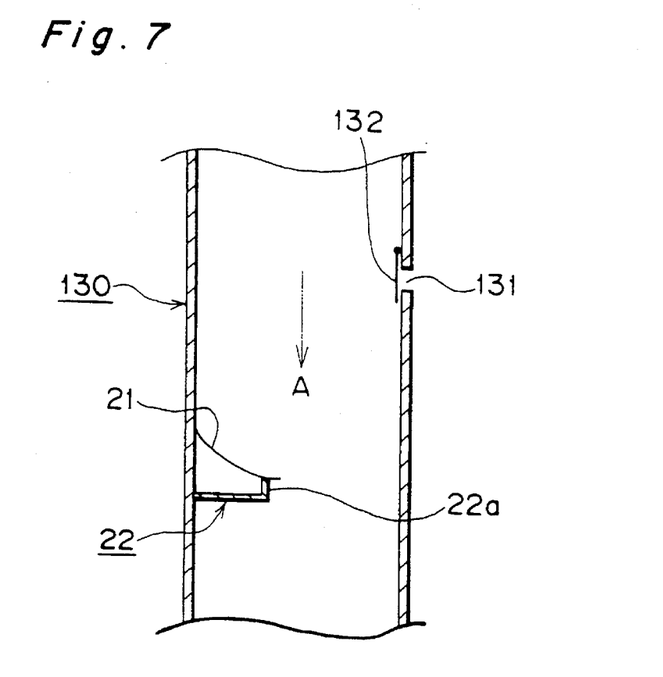
FIG. 7 is a schematic vertical sectional view showing a working state of a water passage for the indicator of embodiment 3.

In this embodiment, a foil-like electrode made of stainless steel is used for the upstream side electrode 21 and a plate-like electrode made of stainless steel is used for the downstream side electrode 22. As shown by FIG. 7, a tip end 22a of electrode 22 is bent to the upstream side and the electrode 21 is so designed that it is deflected to the downstream side to be in contact with the tip end 22a of the electrode 22 when it receives pressure of the passed water. Of course, the electrodes 21 and 22 have such sizes as not to obstruct the water passage 130.

Figure 8:
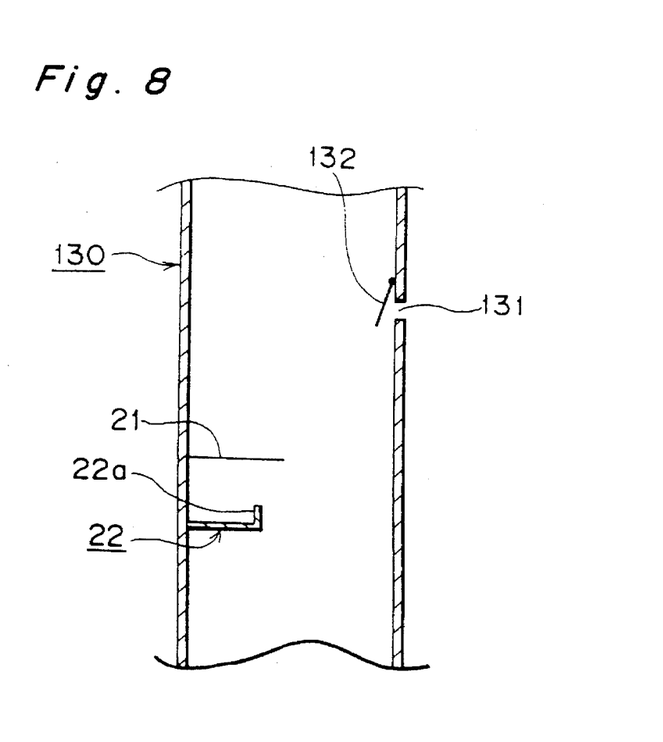
FIG. 8 is a schematic vertical sectional view showing a working state of the water passage for the indicator of embodiment 3.

In the present embodiment, when water passes through the water passage 130, the electrode 21 is deflected by the pressure of the passing water to the downstream side to be in contact with the electrode 22, that is, the electrodes 21 and 22 are electrically connected to cause the light emitting diode 24 to emit light, as shown by FIG. 7. When the water flow is stopped, the electrode 21 returns to the original position, air flows in from the air hole 131, the water securely drains from between the electrodes 21 and 22, the electrodes 21 and 22 are brought into the electrically disconnected state, as shown by FIG. 8, so that the light emitting diode 24 goes out. Consequently, the function and effect the same as those of embodiment 1 can be obtained. In other words, the exhaustion of service life of the cartridge 13, i.e., the exchange time can be indicated by the light emitting diode 24 of the indicator 20.

In this embodiment, since the electrode 21 is deflected to the downstream side during passing water to be in contact with the electrode 22 and in the position inclined to the water passing direction, it does not obstruct the passing water. Further, since the tip end 22a of the electrode 22 is bent to the upstream side, the electrode 21 contacts with the electrode 22 positively.

Embodiment 4

Figure 9:
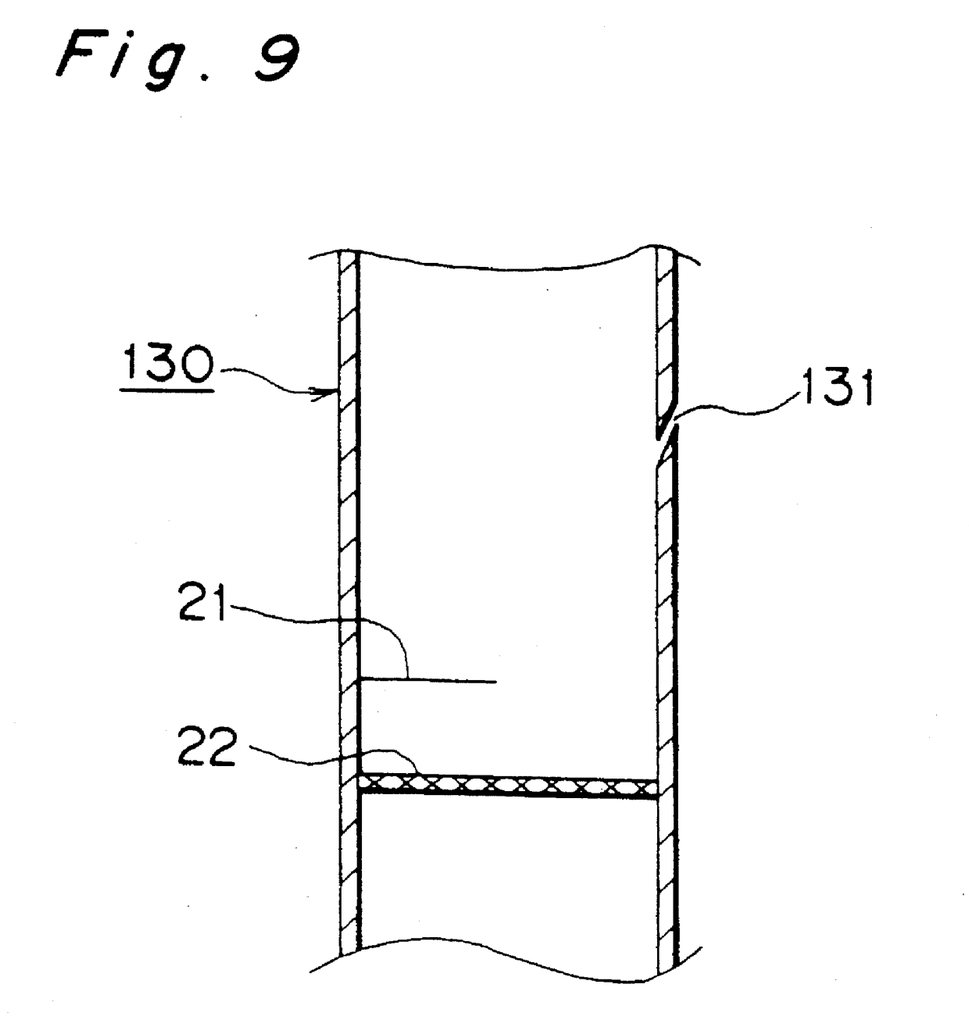
FIG. 9 is a schematic vertical sectional view showing a working state of a water passage for the indicator of embodiment 4.

A cartridge for a water purifier of this embodiment is the same as that of embodiment 3 except for structures of the electrode 22 and the air port 131 in the indicator 20. FIG. 9 is a schematic vertical sectional view showing the water passage 130 under a state where water is not passing, in this embodiment. In the present embodiment, an electrode of the mesh type made of stainless steel is used for the downstream side electrode 22.

Even in the present embodiment, when water flows in the water passage 130, the electrode 21 is deflected by the pressure of passing water to the downstream side to be in contact with the electrode 22 and the electrodes 21 and 22 are electrically connected, so that the light emitting diode 24 emits light in the same way as FIG. 7. When the water flow is stopped, the electrode 21 returns to the original position and air flows in from the air hole 131, and the water positively drains from between the electrodes 21 and 22 to cause the electrodes 21 and 22 to be electrically disconnected, as shown by FIG. 9, so that the light emitting diode 24 goes out. Therefore, function and effect the same as those of the embodiment 3 can be obtained. In other words, the exhaustion of service life of the cartridge 13 i.e. the exchange time can be indicated by the light emitting diode 24 of the indicator 20.

In this embodiment, the electrodes 21 and 22 do not obstruct the passing water because the electrode 21 is deflected to the downstream side during water passing to be in contact with the electrode 22 and in the position inclined to the passing water direction, and the electrode 22 is of the mesh type. Further, since the air hole 131 does not require a valve, its structure is simple.

Embodiment 5

Figure 10:
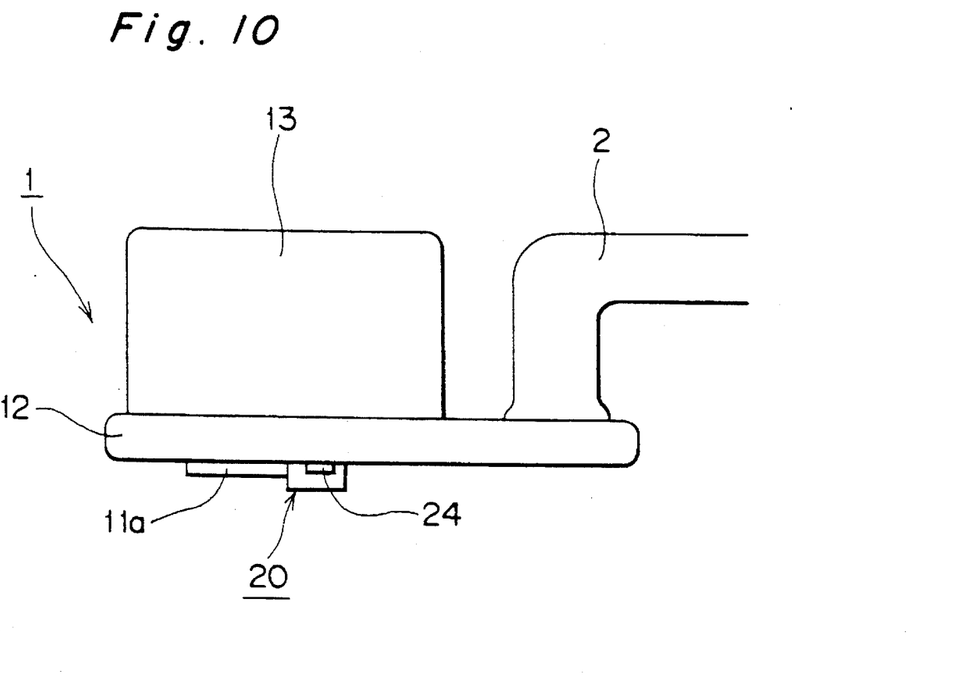
FIG. 10 is a front view showing a water purifier equipped with a cartridge for the water purifier of embodiment 5.
Figure 11:
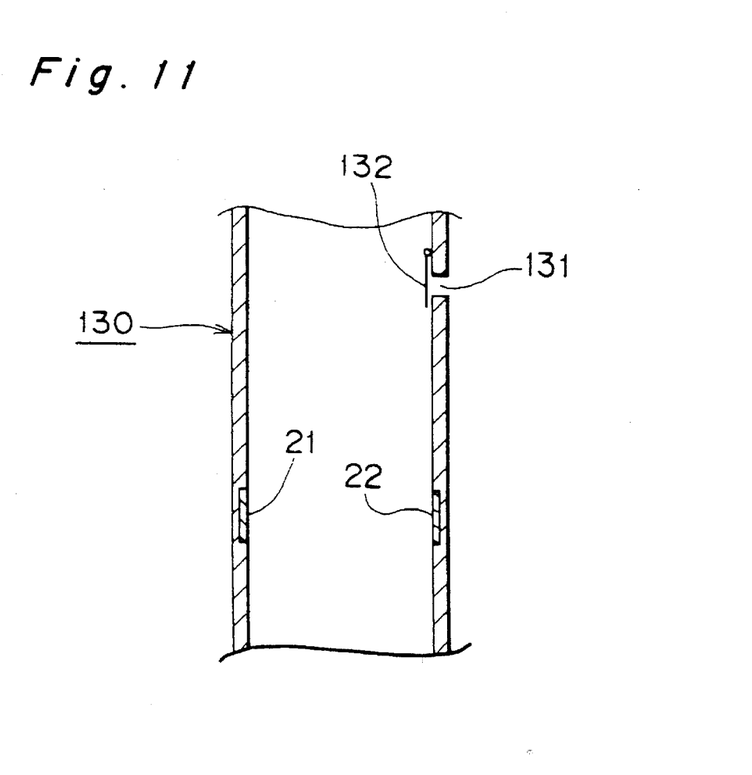
FIG. 11 is a schematic vertical sectional view showing a working state of a water passage for an indicator of embodiment 5.

FIG. 10 is a front view showing a water purifier using a cartridge of this embodiment. This water purifier 1 is one having an outlet 11a including a city water outlet and a purifier water outlet integrally. The cartridge for a water purifier of this embodiment is the same as that of the embodiment 1 except for the structures of the electrodes 21 and 22 of the indicator 20. In this embodiment, the electrodes 21 and 22 are formed into curved-plate-like shapes made of stainless steel and fit in concave portions formed on an inside wall of the water passage 130, as shown by FIG. 11. Surfaces of the electrodes 21 and 22 are flush with a surface of the inside wall of the water passage 130.

Even in the present embodiment, when water flows in the water passage 130, the electrodes 21 and 22 are electrically connected utilizing the water as the medium to cause the light emitting diode 24 to emit light. When the water flow is stopped, air flows in from the air hole 131 and the water positively drains from between the electrodes 21 and 22 to cause the electrodes 21 and 22 to be electrically disconnected, so that the light emitting diode 24 goes out. Therefore, function and effect the same as those of embodiment 1 can be obtained. In other words, the exhaustion of service life of the cartridge 13 i.e. the exchange time can be indicated by the light emitting diode 24 of the indicator 20. Incidentally, since the water passage 130 is so installed as to communicate with a water passage in the cartridge 13, the indicator 20 is operated only by passing purified water even in the above-mentioned water purifier including the city water outlet and purified water outlet integrally.

In this embodiment, since the electrodes 21 and 22 are fit in the concave portions of the inside wall of the water passage 130 and the surfaces of the electrodes 21 and 22 are flush with the surface of inside wall of the water passage 130, they do not obstruct the passing water entirely.

Embodiment 6

Figure 12:
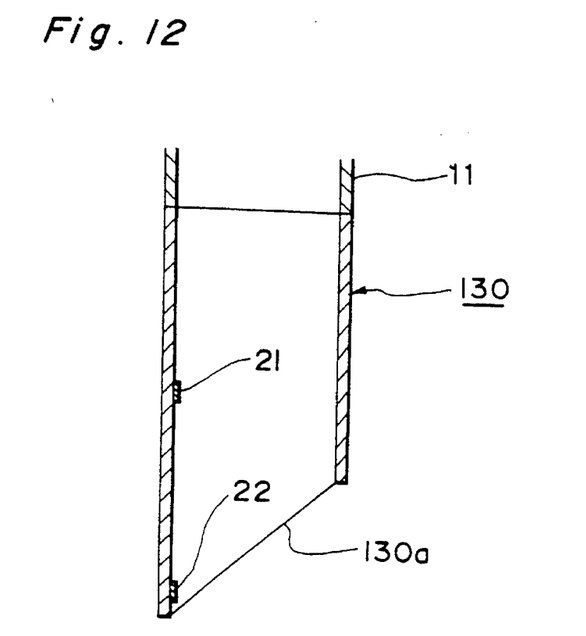
FIG. 12 is a schematic vertical sectional view showing a working state of a water passage for an indicator of embodiment 6.

A cartridge for a water purifier of this embodiment is the same as that of embodiment 1 except that the structures of the electrodes 21 and 22 and the water passage 130 in the indicator 20 are different from those of embodiment 1 and the air hole 131 and the valve 132 are not used. In this embodiment, the water passage 130 is connected to an end portion of the purified water outlet 11 at one end and opened and cut obliquely at its other end, as shown by FIG. 12. 130a is an obliquely cut open end. The removal mechanism for removing water remaining between the two electrodes 21 and 22 after completion of water passing is composed of the open end 130a. The electrodes 21 and 22 are formed into curved-plate-like shapes made of stainless steel and installed side by side along the inside wall of the water passage 130. Naturally, the electrodes 21 and 22 have thicknesses not to block the water passage 130. The electrode 22 is installed in the vicinity of tip end of the open end 130a.

Even in the present embodiment, the electrodes 21 and 22 are electrically connected utilizing the passing water as the medium to cause the light emitting diode 24 to emit light when the passing water exists in the water passage 130. When the water flow is stopped, the water in the water passage 130 flows out with good water break because the open end 130a is cut obliquely, and the water positively drains between the electrodes 21 and 22 to cause the electrodes 21 and 22 to be electrically disconnected, so that the light emitting diode 24 goes out. Therefore, the function and effect the same as those of embodiment 1 can be obtained. In other words, the exhaustion of service life of the cartridge 13, i.e., the exchange time can be indicated by the light emitting diode 24 of the indicator 20.

In this embodiment, since the electrodes 21 and 22 are formed into the curved-plate-like shapes and installed along the inside wall of the water passage 130, they do not block the water passing. Further, since it is not required to install an air hole 131 and valve 132 but it is required only to make the obliquely cut open end 130a, the structure is simple.

Both of the electrodes 21 and 22 may be installed in the vicinity of the tip end of the open end 130a. Further, electrodes having structures shown in the embodiments 1 to 5 may be used for the electrodes 21 and 22.

Embodiment 7

Figure 13:
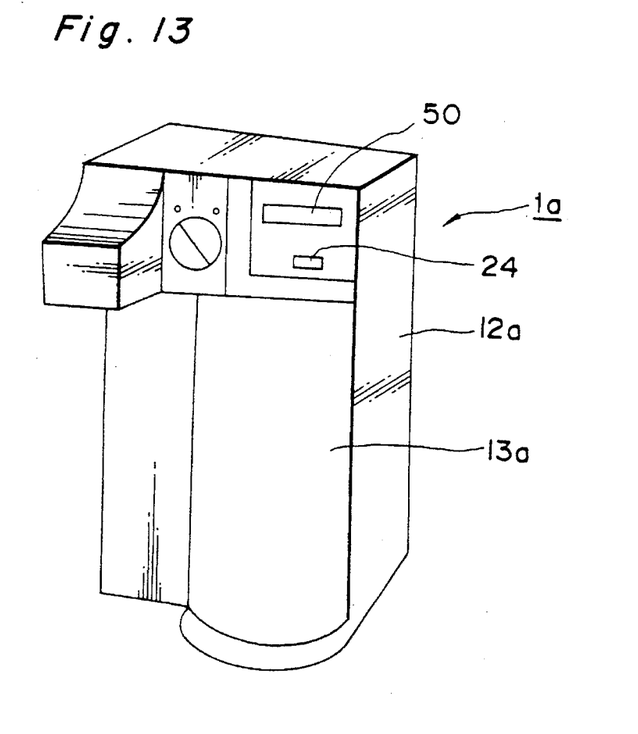
FIG. 13 is an oblique view showing a demineralizer equipped with the cartridge of embodiment 7.
Figure 14:
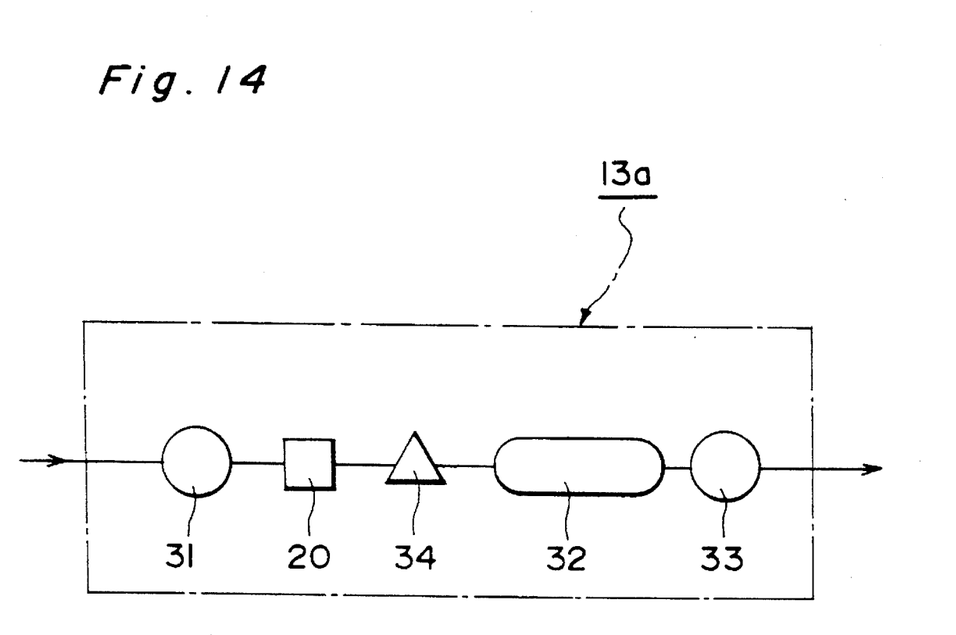
FIG. 14 is a block diagram showing a composition of the cartridge of embodiment 7.

FIG. 13 is an oblique view showing a demineralizer using a cartridge of this embodiment. A demineralizer 1a is equipped with a body 12a and a detachable cartridge 13a. FIG. 14 is a block diagram showing the structure of the cartridge 13a. The cartridge 13a is equipped with a filter 31, an indicator 20, a water tank 34, an ion exchange resin 32, and a filter 33 in this order from upstream side to downstream side. The filter 33 has a higher filtration accuracy. The water tank 34 prevents demineralized water from being contaminated by air mingling in the water passage beyond the ion exchange resin 32. The indicator 20 and the water tank 34 may be installed at an upstream side of the filter 31. 24 is a light emitting diode, 50 is a specific resistance meter, and 130 is a water passage. The indicator 20 is the same as that of embodiment 1 shown in FIG. 2 to FIG. 4.

Even in the present embodiment, when the passing water exists in the water passage 130, the electrodes 21 and 22 are electrically connected utilizing the water as the medium and the light emitting diode 24 emits light. When the water flow is stopped, air flows in from the air hole 131 and the water positively drains from between the electrodes 21 and 22 to cause the electrodes 21 and 22 to be electrically disconnected, so that the light emitting diode 24 goes out. Therefore, the function and effect the same as those of embodiment 1 can be obtained. In other words, the exhaustion of service life of the cartridge 13a i.e. the exchange time can be indicated by the light emitting diode 24 of the indicator 20.

Either of the indicators described in the embodiments 2 to 6 may be used for the indicator 20, and same function and effect can be obtained.

As mentioned above, the indicator 20 can be used for the cartridge 13a of the demineralizer 1a in the same way as the water purifier 1.

OTHER EMBODIMENTS (1) Application of the indicator 20 is not limited to the water purifier and demineralizer as shown in the embodiments 1 to 7. The indicator 20 may be used for other types of equipment provided that their service lives are determined by the total water flow, in the same way, i.e., in such a manner that the electrodes 21 and 22 are electrically connected by passing water.

(2) A silver battery, for example may be used in place of the primary lithium battery 23. However, a battery such as a dry cell, which gradually decreases its discharge voltage as it discharges, is not preferable because emitting-light or not-emitting-light of the light emitting diode 24 is indistinct. Further, use of a secondary battery is economical because it can be used repeatedly by being recharged. A lithium battery, lead battery and nickel-cadmium battery etc., for example, may be used for the secondary battery.

(3) An electrode made of platinum, lead or nickel may be used for the electrodes 21 and 22 of embodiments 1 and 2 and the electrode 22 of embodiment 4. An electrode made of platinum or nickel may be used for the electrodes 21 and 22 of embodiment 3 and the electrode 21 of embodiment 4.

(4) In case the service life of the cartridge is shortened by passing hot water, it becomes possible to indicate the state of passing hot water and the service life of the cartridge by installing a thermister which changes its resistance value with a rise of temperature. In an example, the thermister is installed in the water passage 130 of the indicator 20. In this structure, a larger electric current flows through the circuit of the indicator 20 because the resistance value of the thermister changes remarkably when hot water is passed. A larger current flow causes the light emitting diode 24 to emit brighter light because the light emitting diode 24 changes its brightness by a varying electric current value. Accordingly, a state where the hot water is flowing can be indicated. A larger current flow causes a large consumption of the battery 23, so that the discharge life of the battery 23 becomes exhausted early. Consequently, the service life of the cartridge 13 shortened by passing hot water can be indicated, too.

What is claimed is:

1. A life indicator adapted to be detachably attached to and used for a device whose service life is determined on the basis of total water flow, and which indicates the service life of the device; comprising:

a normally open circuit including two spaced apart electrodes, a battery and a light emitting diode which emits light utilizing the battery as a power source, and a water passage operatively communicating with said device, the two electrodes being constructed and disposed in the water passage such that one electrode is deflected by pressure of the passing water in the water passage to contact with the other electrode to thereby make electrical contact therewith, means for removing water remaining between the two electrodes after completion of passing water, whereby an electric current flows to the light emitting diode when the two electrodes are electrically connected, and the battery is of a type having a discharge life equal to the service life of said device.

2. A life indicator as set forth in claim 1, in which the removing means comprises an air hole disposed in a wall of said passage upstream of the two electrodes.

3. A life indicator as set forth in claim 1, in which the removing means comprises the downstream end of the water passage being open and obliquely cut.

4. A life indicator as set forth in claim 1, in which the battery has a voltage flatness and a property of abrupt drop in its voltage at a capacity end.

5. A life indicator as set forth in claim 1, wherein said battery only powers said light emitting diode.

6. A device including a cartridge detachably attached to and used for a water purifier or a demineralizer and having a service life determined on the basis of total water flow; comprising:

a life indicator indicating the service life of the cartridge, a normally open circuit including two spaced apart electrodes, a battery and a light emitting diode which emits light utilizing the battery as a power source, and a water passage operatively communicating with said device, the two electrodes being constructed and disposed in the water passage such that one electrode is deflected by pressure of the passing water in the water passage to contact with the other electrode to thereby make electrical contact therewith, means for removing water remaining between the two electrodes after completion of passing water, whereby an electric current flows to the light emitting diode when the two electrodes are electrically connected, and the battery is of a type having a discharge life equal to the service life of said device.

7. A cartridge as set forth in claim 6, in which the removal means comprises an air hole disposed in a wall of said passage upstream of the two electrodes.

8. A cartridge as set forth in claim 6, in which the removing means comprises the downstream end of the water passage being open and obliquely cut.

9. A cartridge as set forth in claim 6, in which the battery has a voltage flatness and a property of abrupt drop in its voltage at a capacity end.

10. A device as set forth in claim 6, wherein said battery only powers said light emitting diode.

* * * * *

UNITED STATES PATENT AND TRADEMARK OFFICE
CERTIFICATE OF CORRECTION

PATENT NO. : 5,458,766
DATED : October 17, 1995
INVENTOR(S) : Katuo EHARA et al.

It is certified that error appears in the above-indentified patent and that said Letters Patent is hereby corrected as shown below:

Please correct the Assignee from "Yuasa Corporation" to --Yuasa Corporation and Katuo EHARA--.

Signed and Sealed this

Sixteenth Day of January, 1996

Attest:

BRUCE LEHMAN

*Attesting Officer*  *Commissioner of Patents and Trademarks*